(12) United States Patent
Hagen (10) Patent No.: US 12,422,043 B2
(45) Date of Patent: Sep. 23, 2025

(54) VALVE PLUGS INCLUDING HARDENED TIPS

(71) Applicant: Fisher Controls International LLC, Marshalltown, IA (US)

(72) Inventor: Cory Hagen, Johnston, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 420 days.

(21) Appl. No.: 17/892,002

(22) Filed: Aug. 19, 2022

(65) Prior Publication Data

US 2023/0304585 A1  Sep. 28, 2023

(30) Foreign Application Priority Data

Mar. 22, 2022  (CN) .......................... 202210289172.X (51) Int. Cl.
*F16K 1/36* (2006.01)
*F16K 25/00* (2006.01)

(52) U.S. Cl.
CPC .............. *F16K 1/36* (2013.01); *F16K 25/005* (2013.01)

(58) Field of Classification Search
CPC ............. F16K 1/36; F16K 1/38; F16K 25/005
See application file for complete search history.

(56) References Cited

U.S. PATENT DOCUMENTS

| | | | |
|---|---|---|---|
| 8,701,553 B2 * | 4/2014 | McCarter ............ | B65D 90/626 137/329.01 |
| 10,151,397 B2 * | 12/2018 | Mann, III ................ | F16K 1/36 |
| 10,371,265 B2 * | 8/2019 | Richardson .............. | F16K 1/32 |
| 12,196,341 B2 * | 1/2025 | Vlassoff .................. | F16K 5/08 |
| 2020/0018422 A1 * | 1/2020 | Weber .................. | F16K 25/005 |

\* cited by examiner

*Primary Examiner* — Michael R Reid
(74) *Attorney, Agent, or Firm* — Hanley, Flight & Zimmerman, LLC (57) ABSTRACT

Valve plugs including hardened tips are disclosed herein. An example apparatus disclosed herein includes a plug holder, a sleeve coupled to the plug holder, the sleeve including a lip, a valve plug tip retained by the lip, and a spacer disposed between the plug holder and the tip, the sleeve surrounding the spacer.

20 Claims, 9 Drawing Sheets

VALVE PLUGS INCLUDING HARDENED TIPS

FIELD OF THE DISCLOSURE

This disclosure relates generally to control valves and, more particularly, to valve plugs including hardened tips.

BACKGROUND

Processing plants use control valves in a wide variety of applications such as, for example, controlling product flow in a food processing plant, maintaining fluid levels in large tank farms, fossil fuel processing, etc. Automated control valves are used to manage the product flow or to maintain the fluid levels by functioning like a variable passage. The amount of fluid flowing through a valve body of an automated control valve can be accurately controlled by precise movement of a valve member (e.g., a valve plug). A valve stem or shaft operatively couples the valve plug to an actuator such as, for example, a pneumatic actuator, a manual actuator, etc. The actuator moves the valve plug between an open position at which the valve plug is spaced from a valve seat to allow fluid flow through the passageway and a closed position at which the valve plug engages the valve seat to prevent fluid flow through the passageway.

BRIEF DESCRIPTION OF THE DRAWINGS

In general, the same reference numbers will be used throughout the drawing(s) and accompanying written description to refer to the same or like parts. The figures are not to scale. Instead, the thickness of the layers or regions may be enlarged in the drawings.

The figures as depicted herein include patterned shading (e.g., cross-hashing, dot-filling, etc.). Such patterned shading is included for illustrative purposes and should not be construed to refer to the material composition of the parts. Particularly, parts including different shading patterns may be composed of a same material and parts with the same shading patterns may be composed of different materials.

DETAILED DESCRIPTION

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the orientation of features, forces and moments are described with reference to the vertical, radial and circumferential axis of the control valve associated with the features, forces and moments. As used herein, the term "vertical" refers to directions along the direction of valve travel. As used herein, the term "radial" refers to directions perpendicular to the direction of travel of the valve. As used herein, the term "circumferential" refers to directions about to the vertical direction.

In severe service applications such as, for example, in the petrochemical industry, control valves may be subjected to severely erosive service conditions that can rapidly wear or reduce the operating life of the valve trim (e.g., a valve seat, a valve plug, etc.). For example, the valve trim may be exposed to flowing process fluids that contain entrained particulate (e.g., petrochemical debris, etc.). The entrained particulate can damage (e.g., remove material) and/or rapidly wear a sealing surface of a valve seat and/or a sealing surface of a valve plug made of metal as the fluid carrying the particulate flows between the inlet and the outlet. Such damage is exacerbated in high differential pressure applications because the particulate may impact the metallic surfaces of the valve seat and/or the valve plug at relatively high velocities. A sealing or throttling surface of the valve seat and/or the valve plug that is damaged or worn in this manner becomes ineffective at controlling fluid flow, resulting in a significantly reduced operating life of the valve trim. Additionally, such damage can allow leakage through the valve trim further degrading the sealing surfaces, reducing the performance of the valve, and potential damage to downstream components.

In severe service applications, valve seats and/or valve plugs made of carbide materials are often employed to reduce damage and/or wear caused by severely erosive process fluids that may otherwise damage metallic valve seats and/or valve plugs, thereby increasing the operating life of the valve seat and/or valve plug. However, although carbide valve seats and/or valve plugs are highly resistant to the above-noted erosive or corrosive effects of particulate and the like, such carbide valve plugs and/or valve seats may not withstand relatively high actuator thrust forces that are often required to provide a tight fluid flow shut-off. For example, the actuator imparts a relatively high seating load or force to the valve plug when the valve plug sealingly engages the valve seat to provide a relatively tight shut-off and prevent or restrict fluid flow through the passageway of the valve for on/off applications. In such examples, the narrow band of contact between the plug and the valve seat and the brittleness of carbide may cause cracking in the plug and the valve seat. Additionally, entrained particulate matter in the process fluid can cause the carbide to vibrate at relatively high frequencies. Under such vibrations, a valve plug and/or valve seat made of carbide can fracture, shatter and/or crack.

Some prior carbide valve plugs are assembled via shrink fitting. However, assembling a carbide valve plug via shrink fitting can be difficult due to the high temperatures involved. Shrink fits can also cause large tension areas (e.g., highly strained areas, etc.) in the valve plug, which can lead to cracking in the carbide tip. Additionally, the difference between the service temperature of the valve (e.g., approximately 900° F., etc.) and maximum material temperature of the carbide (e.g., approximately 1150° F., etc.) is relatively small, which can make the process of designing and installing a shrink fit difficult.

Examples disclosed overcome the above noted deficiencies. Some example valve plugs disclosed herein include a four-piece assembly including a plug holder, a spacer, a carbide tip, and a sleeve. In some examples disclosed herein, the sleeve of the plug is threadedly coupled to the plug holder. In some such examples disclosed herein, the sleeve of the plug is further coupled to the plug holder via one or more pins and/or welds. In some examples disclosed herein, the sleeve retains the carbide tip to the valve plug and can be configured to control the clamped load on the carbide tip. In some examples disclosed herein, the spacer is composed of material with a comparatively higher rate of thermal expansion than the carbide tip to compensate for the different rates of the thermal expansion between the carbide tip and the sleeve to ensure the carbide tip is retained during operation of the valve. In some examples disclosed herein, the spacer cushions the carbide tip from impacts and/or dampens vibrations that can induce crack formation in the carbide tip.

Some example valve plugs described herein include segregated throttling and shutoff portions. In some examples disclosed herein, the sleeve of the valve plug acts as the shutoff surface and the carbide tip of the valve plug acts as the throttling surface. In some examples disclosed herein, the sleeve of the valve plug is configured to sit on the valve sleeve when the valve is closed, which prevents fluid from flowing through the valve. In some examples disclosed herein, the shutoff function of the sleeve enables a comparatively tighter closure relative to prior designs with carbide-on-carbide shutoff functions. In some such examples, the metallic seat surface is able to deform under lower thrust loads than carbide components, which improves the contact between the plug and the sleeve during shutoff. In some such examples disclosed herein, the metallic sleeve is more resistant to high impact loads during valve shutoff, which can occur during exposures to large, unbalanced forces. In some examples disclosed herein, the carbide tip includes a dead band portion, which prevents fluid flow during initial valve travel from the shutoff position. In some such examples disclosed herein, the pressure drop associated with valve seat is reduced.

In some examples disclosed herein, the valve plug can also include an anti-coking wiper to prevent the buildup of deposited of material between the valve plug and the liner of the valve stem. In some such examples disclosed herein, the wiper removes material deposited on the internal guiding surface of the valve liner.

Some example valve plugs disclosed herein include a hybrid tension split collar carbide retainer with a two-piece carbide configuration, as opposed to prior valve plugs that typically include one piece of carbide. In some such examples disclosed herein, the two-piece carbide configuration includes a carbide tip and a carbide deflector. In some examples disclosed herein, a carbide tip is disposed in a 2-piece split coupler with a spacer disc that has a comparatively higher thermal expansion rate. In some such examples disclosed herein, the spacer disc expands at a greater rate than the 2-piece coupler and the carbide pieces, which causes the carbide components to be more tightly retained as the plug increases in temperature. In some examples disclosed herein, the valve plug includes a two-piece split coupler that includes a comparatively thinner neck portion and a comparatively wider shoulder area. In some such examples disclosed herein, the shoulder portion of the split coupler retains the carbide deflector piece and the spacer disc to compensate for thermal variation during valve operation. In some examples disclosed herein, the split coupler can be threaded into a plug post of a valve and torqued to an appropriate axial stress to retain the carbide deflector. In some such examples disclosed herein, the thermal expansion of the split coupler during operation of the valve maintains the carbide deflector in compression, which mitigates crack formation in the carbide pieces. In some examples disclosed herein, radial clearances between the carbide pieces, split coupler and the plug post are designed to compensate for the differences in material thermal expansion rates during operation of the valve. Particularly, the radial clearances of the post are configured such that as the outer clearance increases, the inside clearance decreases, thereby retaining the carbide deflector. In some examples disclosed herein, the tip of the plug includes a tri-edge design. In some such examples, the tri-edge design reduces the contact area between the plug and the valve seat, which can reduce adherence (e.g., sticking, etc.) caused by material deposition during operation of the valve. The reduction in adherence helps ensure the valve is responsive to travel commands during operation. In other examples, the tip of the plug can include a circular edge design.

Figure 1:
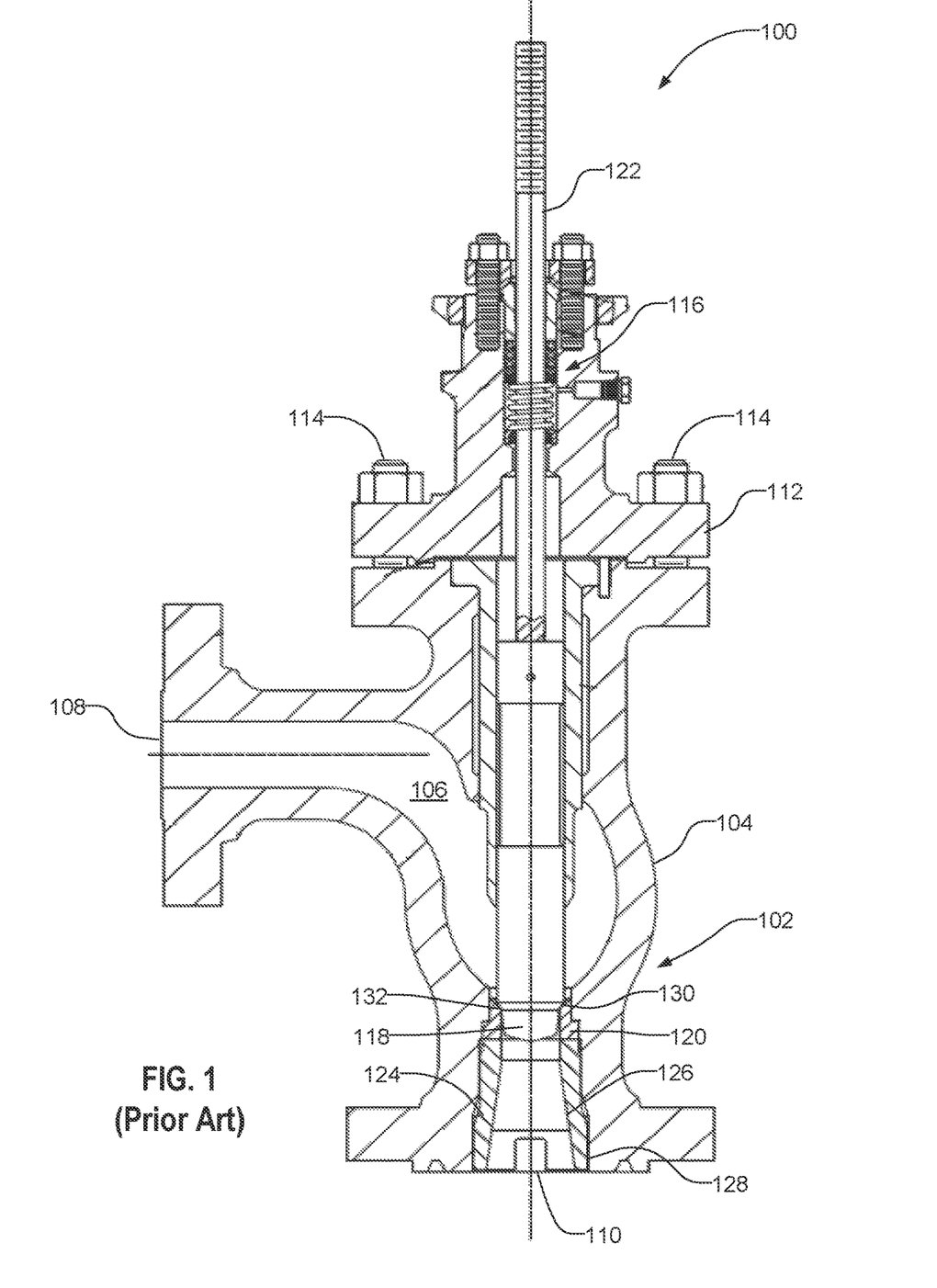
FIG. 1 is a cross-sectional view of a valve including a known valve plug.

FIG. 1 illustrates a known control valve assembly 100 (e.g., a flow down angle-style control valve) implemented with a known valve trim apparatus 102 that may be used in severe service applications (e.g., severely erosive process fluid, high pressure applications, etc.). Referring to FIG. 1, the control valve assembly 100 includes a valve body 104 that defines a fluid flow passageway 106 between an inlet 108 and an outlet port 110. In this example, the inlet 108 is turned at an angle relative to the outlet port 110. A bonnet 112 is coupled to the valve body 104 via fasteners 114 and couples the valve body 104 to an actuator (not shown). The bonnet 112 also houses a packing system 116 to prevent leakage of process fluid to the environment.

The valve trim apparatus 102 includes a flow control member or valve plug 118 and a valve seat or seat ring 120 disposed within the passageway 106. An actuator (e.g., a pneumatic actuator, an electric actuator, a hydraulic actuator, etc.) may be operatively coupled to the valve plug 118 via a valve stem 122 to move the valve plug 118 relative to the seat ring 120 to control the fluid flow through the passageway 106 between the inlet 108 and the outlet port 110. A seat ring retainer or liner 124 retains the seat ring 120 within the valve body 104 and has an elongated body 126 that extends to protect a surface 128 of the outlet port 110 from adverse process effects such as, for example, abrasion, erosion, corrosion, etc. In the illustrated example of FIG. 1, the seat ring 120 and the liner 124 are separate pieces such that the liner 124 engages the seat ring 120 via an interference fit to retain the seat ring 120 within the valve body 104. In other examples, the liner 124 may be integrally formed with the seat ring 120 to form a substantially unitary structure.

In operation, the actuator drives the valve stem 122 and, thus, the valve plug 118 between a closed position at which the valve plug 118 is sealingly engaged with the seat ring 120 to prevent or restrict fluid flow through the passageway 106 between the inlet 108 and the outlet port 110 and a fully open or maximum flow position at which the valve plug 118 is separated from the seat ring 120 to allow fluid flow through the passageway 106 between the inlet 108 and the outlet port 110.

In non-severe fluid conditions (e.g., non-erosive fluid conditions, relatively low pressure differential applications, etc.), the valve plug 118 and/or the seat ring 120 are typically made of a metallic material such as, for example, stainless steel or any other suitable metallic materials. However, in severe service applications, a sealing surface 130 of the valve plug 118 and/or a seating surface 132 of the seat ring 120 may wear rapidly or become damaged. For example, in high differential pressure applications, fluid (e.g., a liquid, gas, steam, etc.) at the inlet 108 of the control valve assembly 100 typically has a relatively high pressure that is reduced to a substantially lower pressure at the outlet port 110 of the control valve assembly 100. The relatively high pressure differential across the control valve assembly 100 significantly increases the velocity of the fluid flowing through the passageway 106 of the valve body 104. The increased velocity can cause the fluid flowing through the control valve assembly 100 to experience turbulent flow, which can impart unwanted fluid forces or other fluid flow effects that may cause damage (e.g., cause material loss) to the surface 130 of the seat ring 120 and/or the surface 132 of the valve plug 118, thereby reducing the operating life of the seat ring 120 and/or the valve plug 118.

Additionally or alternatively, in severe service applications (e.g., petrochemical applications, etc.), the valve trim apparatus 102 may be exposed to severely erosive and/or corrosive fluid conditions that can rapidly wear or cause material loss to the surfaces 130 and/or 132 and significantly reduce the operating life of the valve trim apparatus 102. For example, the valve plug 118 and/or the seat ring 120 may be exposed to process fluids entrained with particulate (e.g., ceramic catalyst fines, particles in a gaseous coal flow etc.), which can wear or degrade the surfaces 130 and/or 132. Further, such erosive damage is exacerbated when severely erosive process fluids that are entrained with the particulate are subjected to a relatively high pressure differential and, thus, increased velocity across the valve trim apparatus 102 because the particulate may impact the surfaces 130 and/or 132 at a relatively high velocity. Such erosive high velocity fluid flows can cause rapid deterioration and/or wear (e.g., material loss, etc.) to the surfaces 130 and/or 132 and significantly decrease the operating life of the valve trim apparatus 102.

In severely erosive fluid conditions, valve plugs and/or valve seats made of carbide and/or ceramic materials are often employed because such materials have relatively high resistance to erosive or corrosive fluid conditions and high pressure differential applications, thereby increasing the operating life of the valve plugs and/or valve seats. For example, referring to the example of FIG. 1, the valve plug 118 and/or the seat ring 120 may be made of a carbide material. In that case, the liner 124 retains the seat ring 120 within the valve body 104. However, coupling the valve plug 118 to the valve stem 122 may require a complex mechanical fastening mechanism. Additionally or alternatively, the carbide valve plug 118 may become damaged (e.g., fracture, crack, shatter, etc.) due to thrust forces and/or seat loads imparted to the valve plug 118 via an actuator sized to provide tight shut-off control during on/off flow applications and/or vibrations from particle matter in the fluid flow.

The following examples refer to valves and valve plugs, similar to the valve and valve plugs described with reference to FIG. 1, except that the valve plug and/or other features of the valve have been modified in accordance with this disclosure. When the same element number is used in connection with FIGS. 2-9 as was used in FIG. 1, it has the same meaning unless indicated otherwise.

Figure 2:
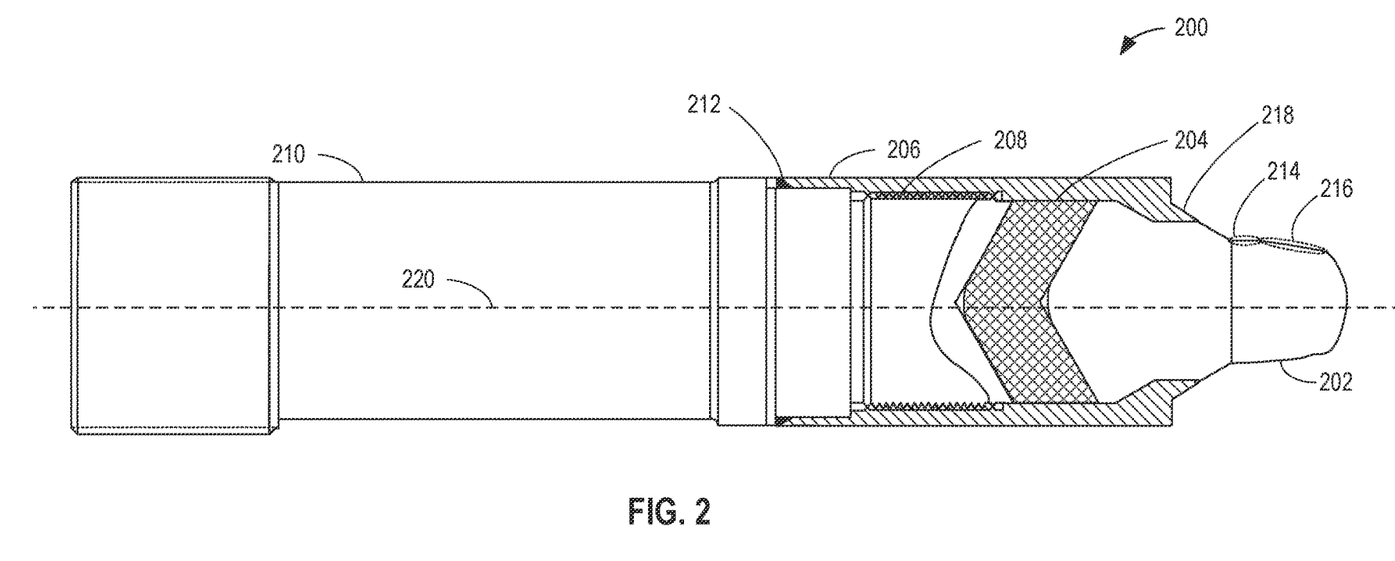
FIG. 2 is a cross-sectional view of an example valve plug implemented in accordance with the teachings of this disclosure that can be used with the valve of FIG. 1.

FIG. 2 is a cross-sectional view of an example valve plug 200 implemented in accordance with the teachings of this disclosure that can be used with the control valve assembly 100 of FIG. 1. In the illustrated example of FIG. 2, the example valve plug 200 includes an example tip 202, an example spacer 204, an example valve sleeve 206, an example holder 208, and an example plug post 210.

The tip 202 is the portion of the valve plug 200 that throttles the flow of the process fluid during the operation of the valve plug 200. The tip 202 is shaped to fit tightly in a valve seat (e.g., the seat ring 120 of FIG. 1, etc.) in operation. The tip 202 can be composed of carbide and/or another suitable erosion resistant material (e.g., a ceramic, etc.). The valve plug 200 includes an example dead band portion 214 and an example throttling portion 216. Travel of the valve plug 200 causes the throttling portion 216 to throttle and/or otherwise interact with the flow of the process fluid. The dead band portion 214 tightly engages with a seat ring of a valve (e.g., the seat ring 120 of FIG. 1, etc.) to prevent the flow of the process fluid during initial movement of the valve plug from the shutoff position (e.g., a fully closed position, etc.). In the illustrated example of FIG. 2, the dead band portion 214 is parallel to an example centerline 220 of the valve plug 200 and the throttling portion 216 is sloped (e.g., converges towards the tip 202, etc.). In other examples, the dead band portion 214 and/or the throttling portion 216 can have any suitable orientation.

The sleeve 206 retains the tip 202 during the operation of the valve plug 200. In the illustrated example of FIG. 2, the sleeve 206 includes an example lip 218 that physically retains the tip 202. In other examples, the lip 218 can be absent. In such examples, the sleeve 206 can retain the tip 202 by any other suitable means. In the illustrated example of FIG. 2, the sleeve 206 is composed of a mellitic material (e.g., a nickel-chromium alloy, titanium, etc.). In other examples, the metallic material can be composed of any other suitable high strength and/or erosion resistance materials. In the illustrated example of FIG. 2, the sleeve 206 is coupled to the plug holder 208 via threads (not illustrated). In the illustrated example of FIG. 2, the sleeve 206 is further coupled to the plug holder 208 via an example weld 212 to prevent rotation of the sleeve 206 relative to the plug holder 208 during operation of the valve plug 200. In other examples, the weld 212 can be absent. In such examples, the sleeve 206 can be coupled to the plug holder 208 by any other suitable means. An example valve plug coupled to the plug holder 208 via a pin is described below in conjunction with FIGS. 5A and 5B.

In the illustrated example of FIG. 2, the spacer 204 separates the plug holder 208 and/or the plug post 210 from the tip 202. The spacer 204 can be composed of a material that is comparatively softer than the material of the sleeve 206 and the tip 202 (e.g., austenitic stainless steel, etc.). In some examples, the spacer 204 is configured to have a thermal expansion rate (e.g., comparatively highest, etc.) compensate for the difference between the thermal expansion rate of the tip 202 (e.g., comparatively lowest) and the sleeve 206 (e.g., comparatively lower). For example, the spacer 204 can be composed of a material with a thermal expansion rate higher than the thermal expansion rate of the sleeve 206, which are both higher than the thermal expansion of the material of the tip 202. As the temperature of the valve plug 200 increases, the volume of the sleeve 206 increases at a faster rate than the volume of the tip 202. In some such examples, the material of the spacer 204 causes it to expand at a rate faster than the tip 202, ensuring the tip 202 does not slide within the sleeve 206 and/or maintains a relative position along the centerline 220 of the valve plug 200.

Figure 3:
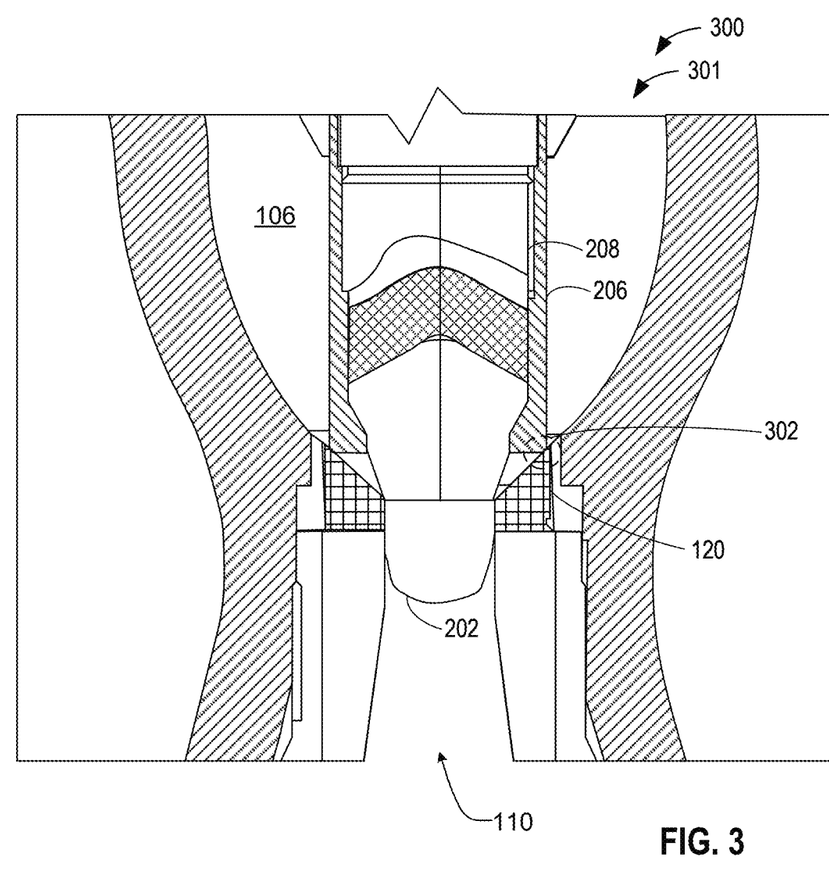
FIG. 3 is a detail view of the valve plug of FIG. 2 in a shutoff position.

FIG. 3 is a detail view of an example valve trim 300 including the valve plug 200 of FIG. 2 in an example fully closed position 301. The example valve trim 300 includes the seat ring 120 of FIG. 1, receives a fluid flow from the fluid flow passageway 106 of FIG. 1, and expels fluid via the outlet port 110 of FIG. 1. In the illustrated example of FIG. 3, an example interface 302 between the valve plug 200 and the seat ring 120 prevents fluid from the fluid flow passageway 106 from being expelled via the outlet port 110. The example interface 302 is formed between the sleeve 206 of the valve plug 200 and the seat ring 120. Because the sleeve 206 is composed of a comparatively soft material (e.g., a nickel alloy, etc.), the sleeve 206 undergoes compatibly more elastic deformation when the valve plug 200 travels to the fully closed position than a carbide-on-carbide interface. In some such examples, the elastic deformation of the sleeve 206 on the seat ring 120 causes the interface 302 to be more leak resistant than an equivalent interface formed via a carbide-on-carbide interface and/or the seal formed between the tip 202 and the seat ring 120.

Figure 4:
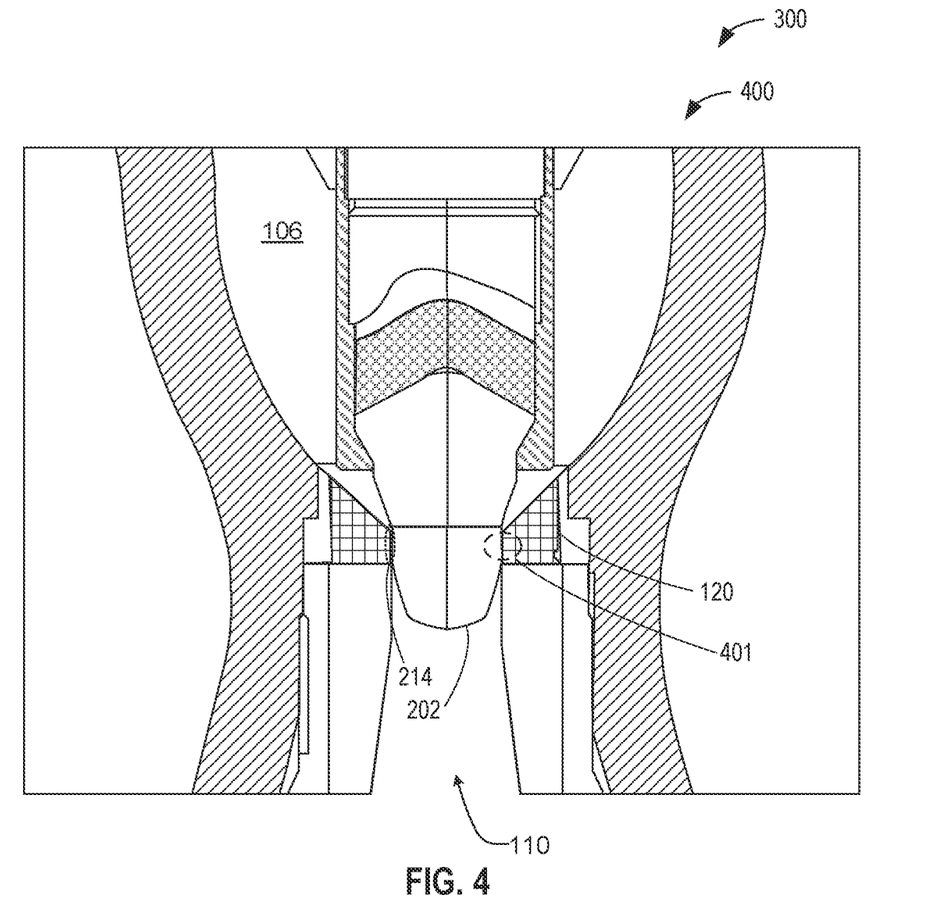
FIG. 4 is a is detail view of the valve plug of FIGS. 2 and 3 in a dead band position.

FIG. 4 is a detail view of the example valve trim 300 including the valve plug 200 of FIG. 2 in an example dead band position 400. The example valve trim 300 includes the seat ring 120 of FIG. 1, receives a fluid flow from the fluid flow passageway 106 of FIG. 1, and expels fluid via the outlet port 110 of FIG. 1. In the illustrated example of FIG. 4, an example interface 401 between the valve plug 200 and the seat ring 120 prevents fluid from the fluid flow passageway 106 from being expelled via the outlet port 110. The example position 400 of FIG. 4 is a position closer to a fully open position than the position 301 of FIG. 3. An example interface 401 is formed between the dead band portion 214 of the tip 202 and the seat ring 120. In the illustrated example of FIG. 4, the sleeve 206 is not in contact with the seat ring 120. However, the outer diameter of the dead band portion 214 is designed to achieve a tight clearance fit with the inner diameter of the seat ring 120, which highly limits the process fluid from being expelled via the outlet port 110. The dead band portion 214 of the valve plug 200 enables small amounts of travel (e.g., travel between the position 301 of FIG. 3 and the position 400 of FIG. 4, etc.), which reduces (e.g., limits, prevents, etc.) the erosion to the seating surface of sleeve 206.

Figure 5A:
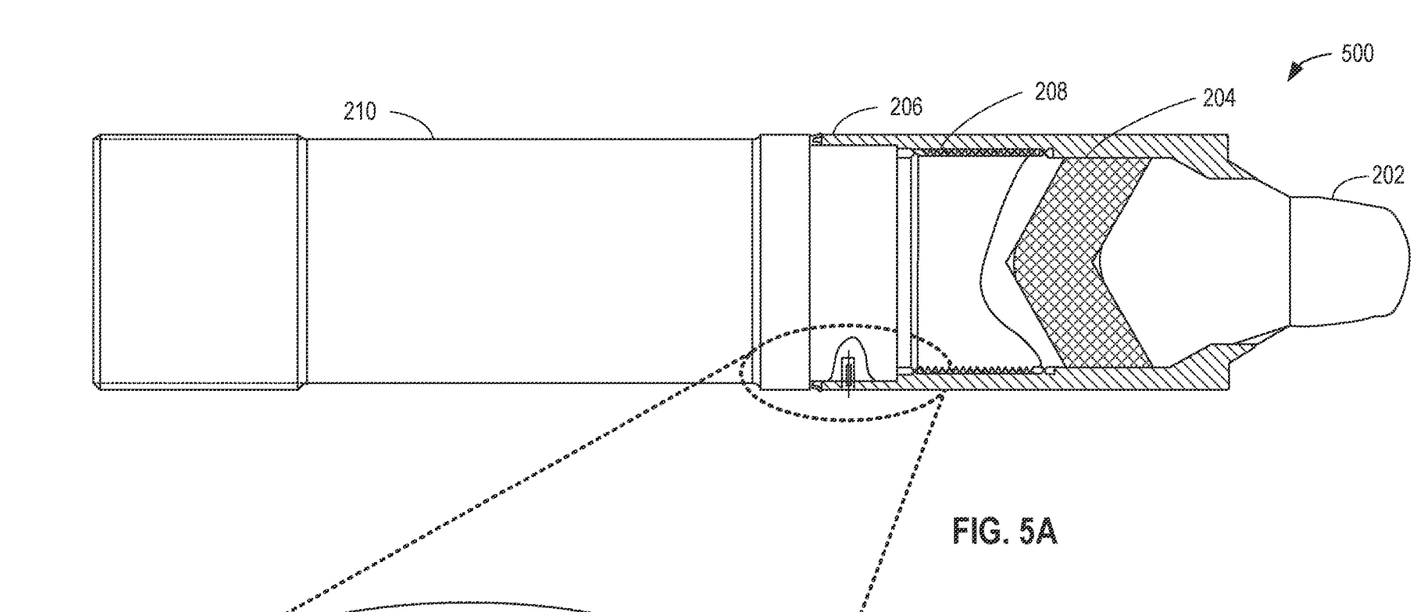
FIG. 5A is a cross-sectional view of another example valve plug implemented in accordance with the teachings of this disclosure that can be used with the valve of FIG. 1.
Figure 5B:
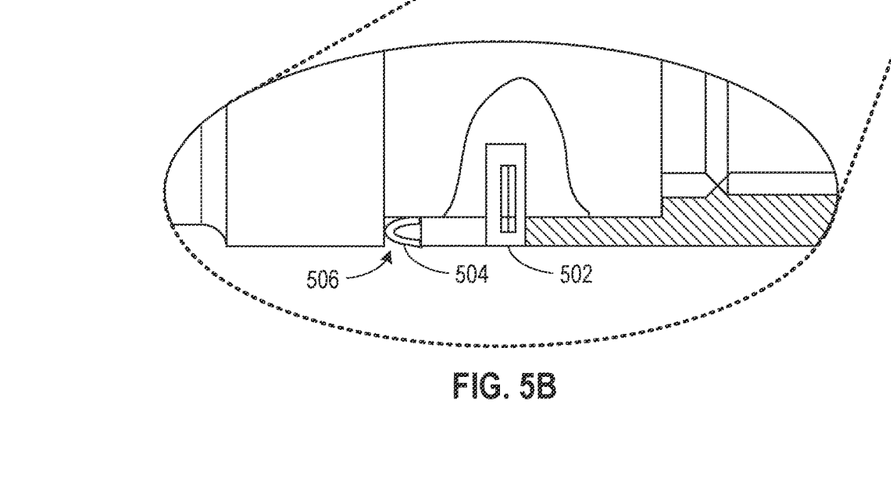
FIG. 5B is a detail view of a portion of the valve plug of FIG. 5A illustrating the anti-rotation pin and the wiper.

FIGS. 5A and 5B illustrate another example plug 500 implemented in accordance with the teachings of this disclosure that can be used with the valve of FIG. 1. The example plug 500 is similar to the valve plug 200 of FIG. 2, except as otherwise noted below. In the illustrated examples of FIGS. 5A and 5B, the plug 500 includes the tip 202 of FIG. 2, the spacer 204 of FIG. 2, the sleeve 206 of FIG. 2, the plug holder 208 of FIG. 2, and the plug post 210 of FIG. 2. The example plug 500 further includes an example pin 502 and an example wiper 504.

In the illustrated example of FIG. 5A, the sleeve 206 is coupled to the plug holder 208 via threads. In the illustrated example of FIG. 2, the sleeve 206 is coupled to the plug holder 208 via the example pin 502 to prevent rotation of the sleeve 206 relative to the plug holder 208 during operation of the valve plug 200. In the illustrated example of FIGS. 5A and 5B, the pin 502 is composed of a same material of as the sleeve 206 (e.g., a nickel alloy, etc.). In other examples, the pin 502 can be composed of any other suitable material (e.g., another metal, carbide, a ceramic, etc.).

In the illustrated example of FIG. 5B, the pin 502 is inserted through the sleeve 206 into the plug holder 208, thereby preventing relative rotation thereof. While the illustrated example of FIGS. 5A and 5B include one pin, the plug 500 can include any suitable number of pins similar to the pin 502 (e.g., two pins, three pins, four pins, etc.). In such examples, the plurality of pins similar to the pin 502 can be evenly circumferentially distributed. In other examples, the plurality of pins 502 can have any suitable distribution.

The wiper 504 is an anti-coking wiper that rubs against the liner between the valve stem and the plug 500. In the illustrated example of FIG. 5B, the wiper 504 is a bent piece of metal disposed within an example cavity 506 axially between sleeve 206 and the plug holder 208. As the plug 500 travels vertically within the valve stem (e.g., the valve stem 122 of FIG. 1, etc.), the wiper 504 removes material (e.g., coke, etc.) that builds up between the plug and the liner (e.g., the liner 124 of FIG. 1, etc.). In some examples, the wiper 504 can be absent (e.g., in operations where material build-up is not a concern, etc.).

Figure 6:
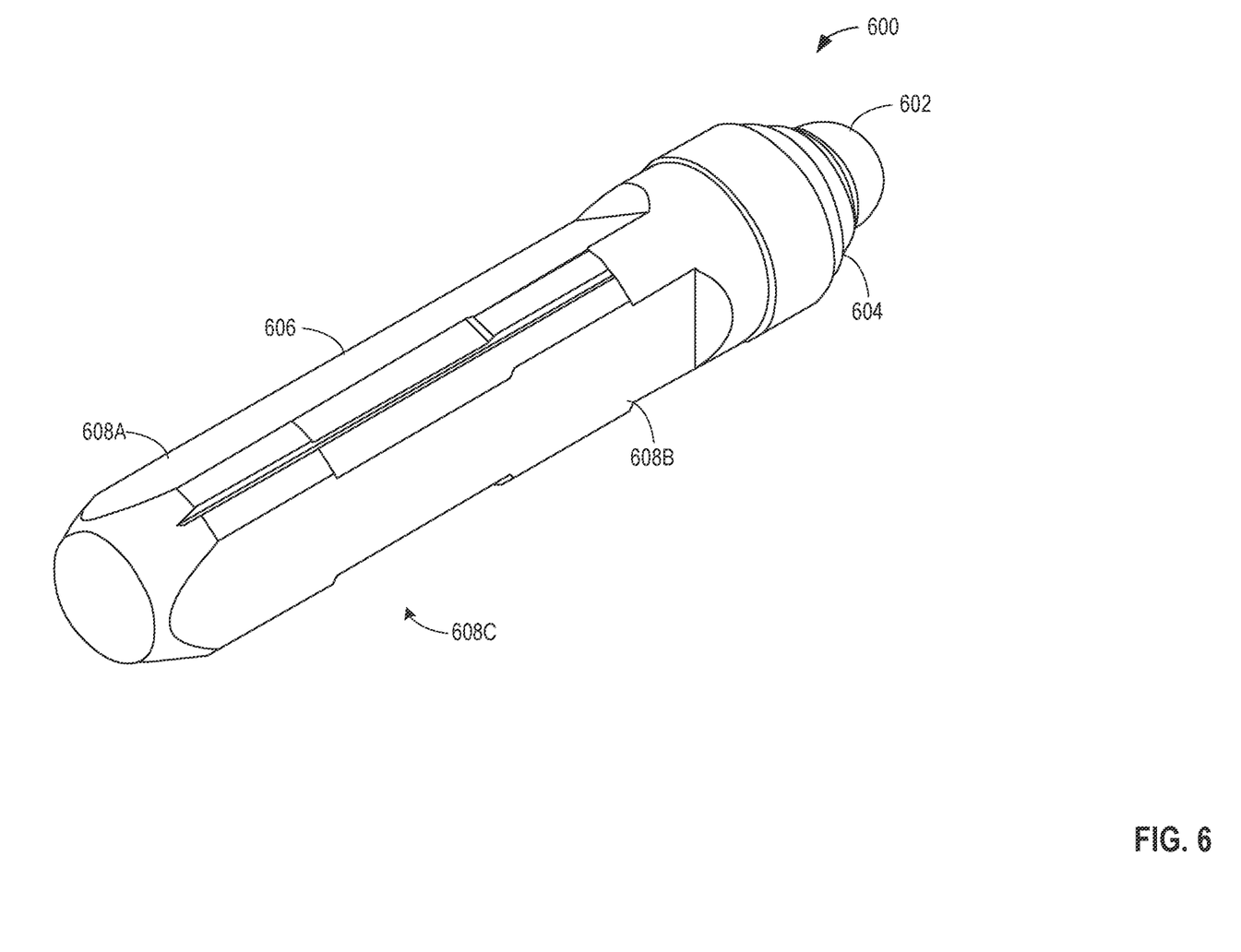
FIG. 6 is a perspective view of another example valve plug implemented in accordance with the teachings of this disclosure.

FIG. 6 is a perspective view of another example plug 600 implemented in accordance with the teachings of this disclosure. In the illustrated example of FIG. 6, the plug 600 includes an example tip 602, an example deflector 604, and example post 606. In the illustrated example of FIG. 6, the post 606 includes an example first face 608A, an example second face 608B, and an example third face 608C.

The tip 602 is the portion of the plug 600 that throttles the flow of the process fluid during operation of the plug 600.

The tip 602 is shaped to fit tightly in a valve seat (e.g., the seat ring 120 of FIG. 1, etc.) in operation. The tip 602 can be composed of carbide and/or another suitable erosion resistant material (e.g., a ceramic, etc.). In the illustrated example of FIG. 6, the tip 602 does not include a dead band portion. In other examples, the tip 602 can include a dead band portion similar to the dead band portion 214 of the tip 202 of FIG. 2. In the illustrated example of FIG. 6, the tip 602 abuts the deflector 604, which is composed of a same material (e.g., carbide, etc.) as the tip 602. In other examples, the deflector 604 can be composed of a different material (e.g., a high-temperature resistant metal, a ceramic, etc.). In the illustrated example of FIG. 6, the plug 600 includes a two-piece carbide configuration (e.g., the tip 602 and the 604, etc.) unlike the valve plug 200 of FIG. 2, the valve plug 500 of FIG. 5, and prior valve plugs.

During operation, the tip 602 and the deflector 604 throttle the process fluid of the valve (e.g., the control valve assembly 100 of FIG. 1, etc.). In some examples, when the control valve assembly 100 is in a fully closed position, the deflector 604 abuts a valve seat (e.g., the seat ring 120 of FIG. 1, etc.), thereby preventing fluid flow out of the valve (e.g., via the outlet port 110 of FIG. 1, etc.).

Figure 7:
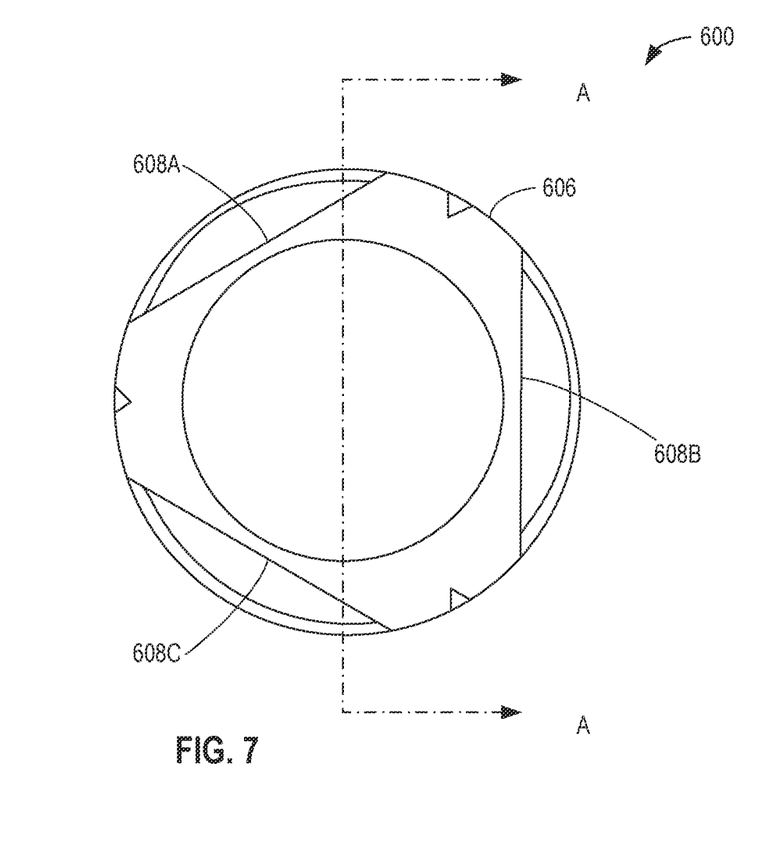
FIG. 7 is a top view of the valve plug of FIG. 6.

FIG. 7 is a top view of the example plug 600 of FIG. 6. In the illustrated example of FIGS. 6 and 7, the post 606 includes a tri-face configuration formed by the faces 608A, 608B, 608C. The faces 608A, 608B, 608C reduce the contact area between the plug post and a liner surrounding the plug, when compared to valve plugs with cylindrical posts. In some such examples, the reduction of contact area associated with the faces 608A, 608B, 608C reduces the likelihood of hydro-locking caused by process fluid trapped between the plug 600 and the liner which improves the responsiveness and performance of the valve. Additionally, the reduced contact area between the plug 600 and other valve components decreases the likelihood of adherence associated with material deposition of the process fluid on the plug causing the plug to become stuck in a particular position. In some such examples, the material associated with the process fluid deposits on the plug 600 when the temperature of the process fluid decreases. Additionally or alternatively, the plug 600 can include a wiper similar to the wiper 504 of FIG. 5 to mitigate negative effects associated with the build of material from the process fluid.

Figure 8:
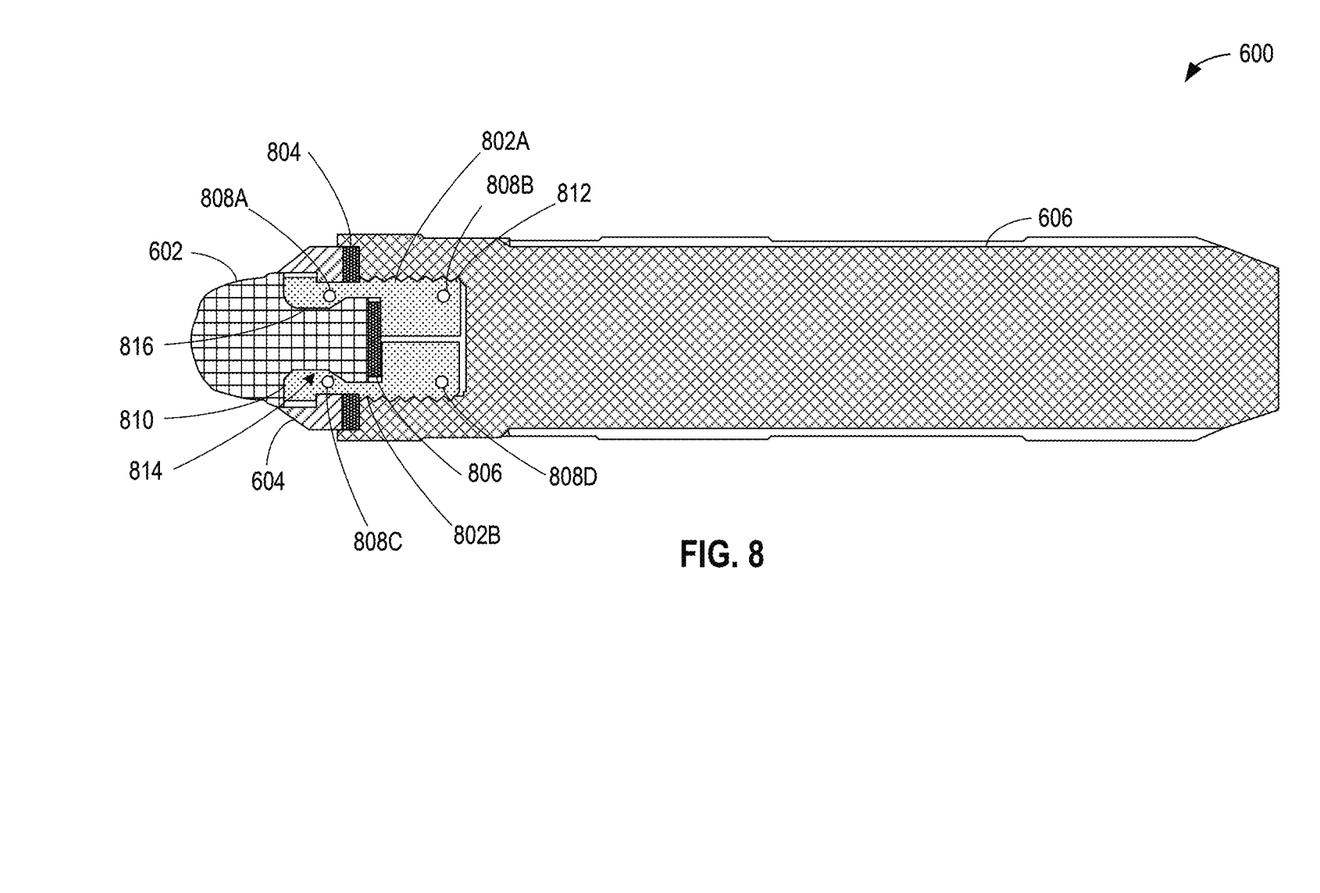
FIG. 8 is a cross-sectional view of the valve plug of FIGS. 6 and 7.

FIG. 8 is a cross-sectional view of the valve plug of FIGS. 6 and 7 taken along the cross-sectional line A-A of FIG. 7. In the illustrated example of FIG. 8, the plug 600 includes the valve tip 602 of FIG. 6, the deflector 604 of FIG. 6, and the post 606 of FIG. 6. In the illustrated example of FIG. 8, the plug 600 further includes an example first coupler component 802A, an example second component coupler 802B, an example first spacer 804, an example second spacer 806, an example first fastener 808A, an example second fastener 808B, an example third fastener 808C, and an example fourth fastener 808D. In the illustrated example of FIG. 8, the coupler components 802A, 802B define an example shoulder portion 810, an example neck portion 812, and example cavity 814.

The coupler components 802A, 802B are structural components that couple the tip 602 and the deflector 604 to the post 606. In the illustrated example of FIG. 8, the deflector 604 and the first spacer 804 are disposed around the neck portion 812 of the coupler components 802A, 802B and the deflector 604 abuts the shoulder portion 810. In the illustrated example of FIG. 8, the neck portion 812 includes threads that threadedly couple the coupler components 802A, 802B to corresponding threads of the post 606. In the illustrated example of FIG. 8, the second spacer 806 and the tip 602 are retained within the cavity 814. In some examples, the coupler components 802A, 802B are composed of a different material than the tip 602 and the deflector 604. For example, the coupler components 802A, 802B can be composed of a nickel-alloy. In other examples, the coupler components 802A, 802B can be composed of any other suitable material.

In the illustrated example of FIG. 8, the first spacer 804 abuts and is adjacent to the deflector 604 and the post 606. The second spacer 806 separates the tip 602 from the coupler components 802A, 802B. In the illustrated example of FIG. 8, the second spacer 806 abuts the tip 602 and an internal face of the cavity 814. The spacers 804, 806 can be composed of a material that is comparatively softer than the materials of the tip 602, the deflector 604, and the coupler components 802A, 802B. For example, the spacers 804, 806 can be composed of austenitic stainless steel. In some examples, the spacers 804, 806 are configured to absorb (e.g., deform, etc.) under high loads and/or high forces to prevent damage to the tip 602, the deflector 604, and the coupler components 802A, 802B. In some examples, the spacers 804, 806 are configured to have a thermal expansion rate (e.g., comparatively highest, etc.) compensate for the difference between the thermal expansion rate of the tip 602 and the deflector 604 (e.g., comparatively lowest, etc.) and the coupler components 802A, 802B (e.g., comparatively lower, etc.). For example, the spacers 804, 806 can be composed of a material with a thermal expansion rate higher than the thermal expansion rate of the coupler components 802A, 802B, which are both higher than the thermal expansion of the material of the tip 602 and the deflector 604. As the temperature of the plug 600 increases, the volume of the spacers 804, 806 increases at a faster rate than the volume of the tip 602, the deflector 604 and the coupler components 802A, 802B, thereby tightly retaining the carbide tip 602 within the cavity 814 as the plug 600 heats. In some examples, as the temperature of the plug 600 increases, the expansion of the spacers 804, 806 causes the tip 602 and the deflector 604 to be more tightly retained to the post 606.

The coupler components 802A, 802B are coupled to the valve post 606. For example, after being joined via the fasteners 808A, 808B, 808C, 808C, the split coupler components 802A, 802B can be threadedly coupled to the plug post. In other examples, the split coupler components 802A, 802B can be coupled to the split coupler by any other suitable means (e.g., one or more fasteners, one or more welds, etc.).

Figure 9:
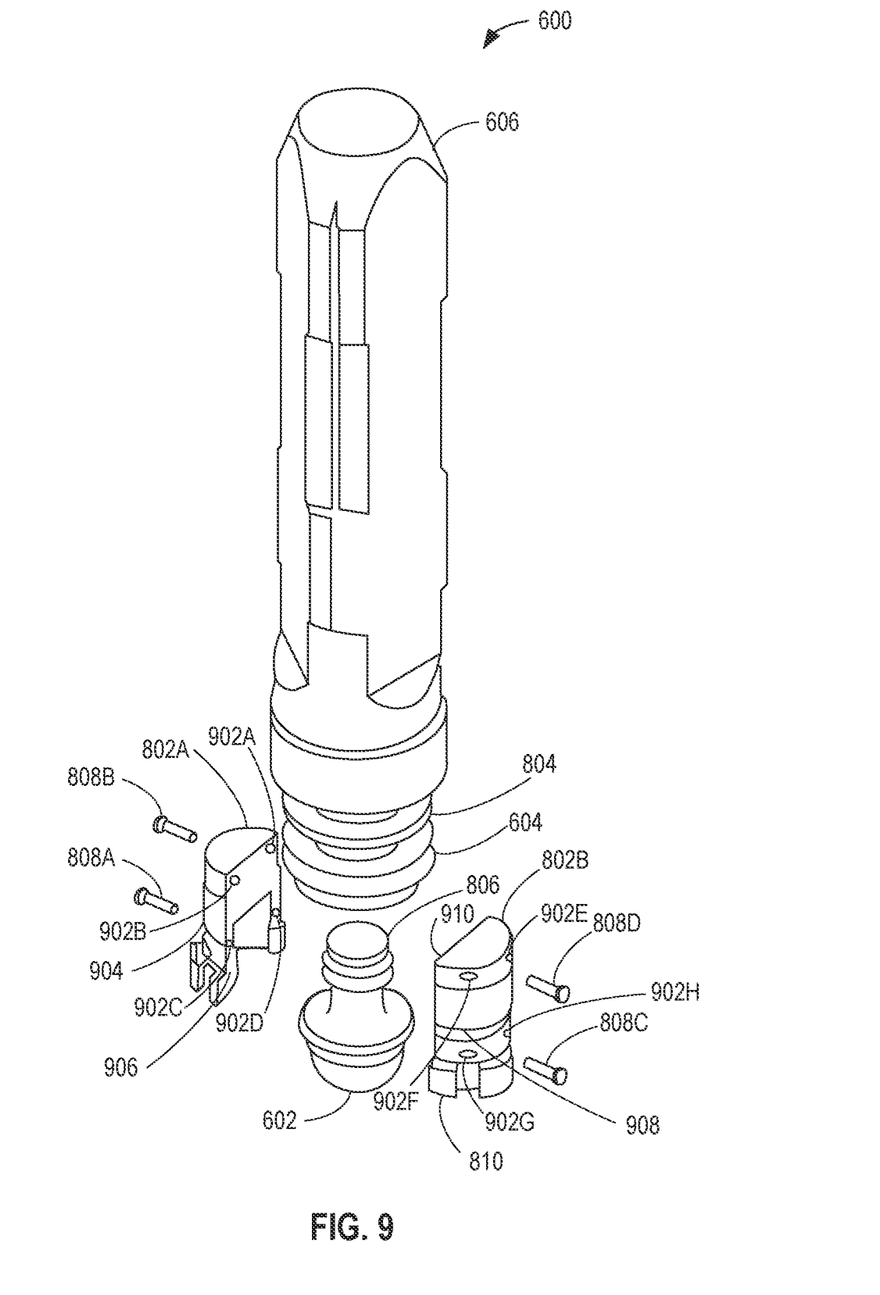
FIG. 9 is an exploded view of the valve plug of FIGS. 6-8.

FIG. 9 is an exploded view of the plug 600 of FIGS. 6-8. In the illustrated example of FIG. 9, the plug 600 includes the valve tip 602 of FIG. 6, the deflector 604 of FIG. 6, the post 606 of FIG. 6, the coupler components 802A, 802B of FIG. 8, the first spacer 804 of FIG. 8, the second spacer 806 of FIG. 8, and the fasteners 808A, 808B, 808C, 808D. In the illustrated example of FIG. 9, the first coupler component 802A includes an example first hole 902A, an example second hole 902B, an example third hole 902C, and an example fourth hole 902D. In the illustrated example of FIG. 9, the first coupler component 802A includes an example first hole 902A, an example second hole 902B, an example third hole 902C, and an example fourth hole 902D. In the illustrated example of FIG. 9, the second coupler component 802B includes an example fifth hole 902E, an example sixth hole 902F, an example seventh hole 902G, and an example eighth hole 902H. In the illustrated example of FIG. 9, the first coupler component 802A includes an example first surface 904 and an example second surface 906. In the illustrated example of FIG. 9, the second coupler component 802B includes an example third surface 908 and an example fourth surface 910. FIG. 9 illustrates the plug 600 in an exploded condition (e.g., disassembled condition, etc.) for illustrative purposes only. The following description corresponds to the plug 600 in an assembled condition.

The split coupler components 802A, 802B are joined by the fasteners 808A, 808B, 808C, 808D. In the illustrated example of FIG. 9, the first fastener 808A extends through the first hole 902A and the fifth hole 902E, the second fastener 808B extends through the fourth hole 902D and the eighth hole 902H, the third fastener 808C extends through the seventh hole 902G and the third hole 902C, and the fourth fastener 808D extends through the sixth hole 902F and the second hole 902B. The coupling of the coupler components 802A, 802B via the fasteners 808A, 808B, 808C, 808D causes the surfaces 906, 910 to abut around the top of the tip 602 and the spacer 804. In some examples, an example lip 816 of the coupler components 802A, 802B causes the tip 602 and the spacer 804 to be retained within the coupler components 802A, 802B. In some examples, some or all of the fasteners 808A, 808B, 808C, 808D and/or the through-holes 902A, 902B, 902C, 902D, 902E, 902F, 902G, 902H can absent. In such examples, the split coupler components 802A, 802B can be coupled by one, two or three of the fasteners 808A, 808B, 808C, 808D. In other examples, the split coupler components 802A, 802B can be joined by any suitable number of fasteners.

After the coupling of the coupler components 802A, 802B, the deflector 604 and the spacer 804 on the shoulder portion 810 of the coupler components 802A, 802B. In some examples, the surfaces 904, 908 can include internal threads and/or external threads (not illustrated) that threadedly couple with corresponding threads (not illustrated) in the internal structure of the post 606. In some such examples, the coupling of the coupler components 802A, 802B to the post 606 also mechanically retains the tip 602, the deflector 604, and the spacers 804, 806.

In some examples, the plug 600 can include one or more anti-rotation pins that extend through the post 606 into one or more of the split coupler components 802A, 802B. In such examples, the anti-rotation pins prevent the relative rotation of the split coupler components 802A, 802B, and the post 606. Additionally or alternatively, the split coupler components 802A, 802B can be coupled to the post 606 via one or more welds and/or any other suitable fastener(s) or method(s).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Valve plugs including hardened tips are disclosed herein. Further examples and combinations thereof include the following:

Example 1 includes an apparatus to be deposed with a valve, the apparatus comprising a plug holder, a sleeve coupled to the plug holder, the sleeve including a lip, a valve plug tip retained by the lip, and a spacer disposed between the plug holder and the tip, the sleeve surrounding the spacer.

Example 2 includes the apparatus of example 1, wherein the tip includes a dead band portion parallel to a centerline of the apparatus, and a throttling portion sloping relative to the centerline.

Example 3 includes the apparatus of example 2, further including a valve seat and wherein a first interface is formed between the sleeve and the valve seat when the tip is in a first position relative to the valve seat.

Example 4 includes the apparatus of example 3, wherein a second interface is formed between the dead band portion and the valve seat when the tip is in a second position relative to the valve seat.

Example 5 includes the apparatus of example 3, wherein the first position is a closed position.

Example 6 includes the apparatus of example 1, wherein the tip is composed of a first material having a first thermal expansion rate, the sleeve is composed of a second material having a second thermal expansion rate greater than the first thermal expansion rate, and the spacer is composed of a third material having a third thermal expansion rate greater than the second thermal expansion rate.

Example 7 includes the apparatus of example 1, further including a wiper disposed in a cavity between the sleeve and the plug holder.

Example 8 includes the apparatus of example 1, wherein the sleeve is threadedly coupled to the plug holder.

Example 9 includes the apparatus of example 8, further including a pin extending through the sleeve into the plug holder, the pin preventing relative rotation of the sleeve and the plug holder.

Example 10 includes the apparatus of example 8, further including a weld coupling the sleeve to the plug holder, the weld preventing relative rotation of the sleeve and the plug holder.

Example 11 includes an apparatus comprising a post, a valve plug tip, a deflector adjacent to the tip, and a coupler coupling the tip to the post, the coupler having a shoulder portion, the coupler defining a cavity, the tip disposed within the cavity, the deflector abutting the shoulder portion.

Example 12 includes the apparatus of example 11, wherein the deflector and the tip are composed of a first material.

Example 13 includes the apparatus of example 11, further including a first spacer disposed between the post and the deflector, and a second spacer disposed between the tip and an internal surface of the coupler.

Example 14 includes the apparatus of example 13, wherein the tip is composed of a first material having a first thermal expansion rate, the coupler is composed of a second material having a second thermal expansion rate greater than the first thermal expansion rate, and at least one of the first spacer of the second spacer are composed of a third material having a third thermal expansion rate greater than the second thermal expansion rate.

Example 15 includes the apparatus of example 13, wherein the coupler further includes a neck portion, the deflector coupled about the neck portion, the first spacer coupled about the neck portion.

Example 16 includes the apparatus of example 13, wherein the first spacer is disposed within the cavity.

Example 17 includes the apparatus of example 11, wherein the coupler includes a first coupler component, and a second coupler component having a same shape as the first coupler component, the second coupler component joined to the first coupler component by a fastener.

Example 18 includes the apparatus of example 11, wherein the coupler is threadedly coupled to the post.

Example 19 includes the apparatus of example 16, further including a pin extending through the post into the coupler, the pin preventing relative rotation of the post and the coupler.

Example 20 includes the apparatus of example 11, further including a valve seat and wherein an interface is formed between the deflector and the valve seat when the tip is in a closed position.

Example 21 includes the apparatus of example 11, wherein the post includes three faces.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a post including a first cavity;
   a valve plug tip;
   a deflector adjacent to the valve plug tip; and
   a coupler coupling the valve plug tip to the post, the coupler having a shoulder portion and a neck portion, the neck portion within the first cavity, the coupler defining a second cavity, the valve plug tip disposed within the second cavity, the deflector abutting the shoulder portion.

2. The apparatus of claim 1, wherein the deflector and the valve plug tip are composed of a first material.

3. The apparatus of claim 1, further including:
   a first spacer disposed between the post and the deflector; and
   a second spacer disposed between the valve plug tip and an internal surface of the coupler.

4. The apparatus of claim 3, wherein:
   the valve plug tip is composed of a first material having a first thermal expansion rate;
   the coupler is composed of a second material having a second thermal expansion rate greater than the first thermal expansion rate; and
   at least one of the first spacer or the second spacer are composed of a third material having a third thermal expansion rate greater than the second thermal expansion rate.

5. The apparatus of claim 3, wherein the first spacer is coupled about the neck portion.

6. The apparatus of claim 3, wherein the first spacer is disposed within the second cavity.

7. The apparatus of claim 1, wherein the coupler includes:
   a first coupler component; and
   a second coupler component having a same shape as the first coupler component, the second coupler component joined to the first coupler component by a fastener.

8. The apparatus of claim 6, further including a pin extending through the post into the coupler, the pin preventing relative rotation of the post and the coupler.

9. The apparatus of claim 1, further including a valve seat and wherein an interface is formed between the deflector and the valve seat when the valve plug tip is in a closed position.

10. The apparatus of claim 1, wherein the post includes three faces.

11. A valve comprising:
    a valve body;
    a valve stem within the valve body; and
    a valve plug coupled to the valve stem, the valve plug including:
       a post;
       a valve plug tip;
       a deflector adjacent to the valve plug tip; and
       a coupler coupling the valve plug tip to the post, the coupler having a shoulder portion and a neck portion, the deflector disposed around the neck portion, the coupler defining a cavity, the valve plug tip disposed within the cavity, the deflector abutting the shoulder portion.

12. The valve of claim 11, wherein the deflector and the valve plug tip are composed of a first material.

13. The valve of claim 11, wherein the valve plug further includes:
    a first spacer disposed between the post and the deflector; and
    a second spacer disposed between the valve plug tip and an internal surface of the coupler.

14. The valve of claim 13, wherein:
    the valve plug tip is composed of a first material having a first thermal expansion rate;
    the coupler is composed of a second material having a second thermal expansion rate greater than the first thermal expansion rate; and
    at least one of the first spacer or the second spacer are composed of a third material having a third thermal expansion rate greater than the second thermal expansion rate.

15. The valve of claim 13, wherein the first spacer is coupled about the neck portion.

16. The valve of claim 13, wherein the first spacer is disposed within the cavity.

17. The valve of claim 11, wherein the coupler includes:
   a first coupler component; and
   a second coupler component having a same shape as the first coupler component, the second coupler component joined to the first coupler component by a fastener.

18. The valve of claim 16, wherein the valve plug further includes a pin extending through the post into the coupler, the pin preventing relative rotation of the post and the coupler.

19. The valve of claim 11, further including a valve seat and wherein an interface is formed between the deflector and the valve seat when the valve plug tip is in a closed position.

20. The valve of claim 11, wherein the post includes three faces.

* * * * *